United States Patent [19]
Girard et al.

[11] Patent Number: 5,386,376
[45] Date of Patent: Jan. 31, 1995

[54] METHOD AND APPARATUS FOR OVERRIDING QUOTIENT PREDICTION IN FLOATING POINT DIVIDER INFORMATION PROCESSING SYSTEMS

[75] Inventors: Luke Girard, San Jose; Ron Zinger, Sunnyvale, both of Calif.

[73] Assignee: Intel Corporation, Santa Clara, Calif.

[21] Appl. No.: 193,797

[22] Filed: Feb. 9, 1994

Related U.S. Application Data

[63] Continuation of Ser. No. 938,003, Aug. 31, 1992, abandoned.

[51] Int. Cl.$^6$ .............................................. G06F 7/52
[52] U.S. Cl. .................................... 364/767; 364/766
[58] Field of Search ........................ 364/767, 766, 748

[56] References Cited

U.S. PATENT DOCUMENTS

| | | | |
|---|---|---|---|
| 4,939,686 | 7/1990 | Fandrianto | 364/767 |
| 4,979,142 | 12/1990 | Allen et al. | 364/767 |
| 5,128,891 | 7/1992 | Lynch et al. | 364/767 |
| 5,177,703 | 1/1993 | Mori | 364/767 |

*Primary Examiner*—David H. Malzahn

[57] ABSTRACT

A hardware implementation for quotient prediction overrule in high speed higher radix SRT division computation circuits. A quotient prediction PLA receives a data segment of the divisor, together with data values from one or more multiplexors. One multiplexor receives as input a partial remainder from a carry-propagate-adder (CPA), which CPA combines into nonredundant form redundant sum and carry vectors derived from a carry-save-adder (CSA) which determines the next partial remainder. The PLA evaluates the next most significant bits (MSBs) of the divisor together with the next MSBs of the next (unlatched) partial remainder to determine the next quotient bits. The quotient estimates given by the quotient prediction PLA are then transmitted to both quotient and remainder generation logic, including a divisior multiple gating multiplexor. The quotient estimate signals together with a sign signal determine the divisor multiple to be used in the next division iteration during the next clock cycle. When ordinary quotient prediction is to be overridden, the state machine sends an appropriate control signal one clock cycle early, whereafter a divisor multiple of zero is combined with the current partial remainder. A divisor multiple of zero causes a previously derived remainder to be recycled unchanged in the remainder datapath, thereby permitting multicomponent data values (i.e., quotient and remainder) to be sequentially routed along a shared datapath and single output bus. Other non zero divisor multiples can be used to force particular mathematical operations at chosen times. By determining the next quotient bits and the divisor multiple in the current clock cycle the divisor multiple before the the speedpath of the SRT division implementation is substantially improved.

24 Claims, 4 Drawing Sheets

METHOD AND APPARATUS FOR OVERRIDING QUOTIENT PREDICTION IN FLOATING POINT DIVIDER INFORMATION PROCESSING SYSTEMS

This is a continuation of application Ser. No. 07/938,003, filed Aug. 31, 1992, now abandoned.

BACKGROUND OF THE INVENTION

1. Field of the Invention

The present invention relates to digital information processing systems, and more particularly relates to microarchitecture hardware implementation in connection with certain mathematical algorithms for improving the computing capacity of such systems.

2. Art Background

Electronic digital computers typically consist of many interconnected integrated circuits (ICs) chips operating together to produce a desired result. Among the various ICs used in a digital computer, are central processing units (CPU's), memory chips, I/O chips to control input and output data transfers, and other general or special purpose chips to enable the computer to achieve the desired function. Analogously, the CPU chip itself consists of numerous internal specialized subsystems, or blocks, which operate together in such a way to permit the CPU to correctly produce the desired function. Among the numerous specialized subsystems contained in the CPU are the blocks providing the floating point mathematical functions for the CPU, internal bus controllers, and the like. For example, a typical digital information processing arrangement is shown in FIG. 1, wherein a central processor 1 communicates with a subsystem floating point unit 2 across a local bus 3. Communications between central processor 1 and floating point unit 2 are governed by a bus controller 4 which coordinates data transfers across the shared datapath forming bus 3. In addition, a control stack 6 serves to store current operands used in execution of the microcode for the central processor 1. A system clock 5 provides a distributed clock signal to all functional subsystems, including processor 1 and floating point unit 2. A decoder section 6a within floating point unit 2 decodes the instruction sequences derived from control stack 6, and then passes the instruction to particular subsystems within the floating point unit, for example divider block 9. Final results produced by divider 9 are then output to an external bus via transceiver 7, as is generally known in the prior art.

Typically, numerical or mathematical functions are provided within the floating point unit 2 by hardware implementations of numerical algorithms for the particular functions desired. In general, there exist numerous algorithms for solving commonly encountered mathematical functions including addition, subtraction, multiplication, division, square root and other root finding functions, exponential, and trigonometric functions. Because the surface area of the silicon substrate on which the component devices of the hardware implementation are fabricated is limited, functional circuitry is shared where possible to reduce the number of unique devices which must be fabricated on the silicon. Accordingly, it is common for certain blocks of circuitry to handle two, three, or more mathematical functions; for example, floating point division, integer division and square root generation may all be produced in the same functional block, namely a divider.

To enhance operational speed for the floating point divider block 9 within the general purpose CPU, a commonly implemented algorithm known as SRT division is used. The number of bits examined during SRT division is expressed in terms of "radix", a specific implementation of SRT division being referred to as a radix n implementation. A prior art hardware implementation of radix 4 SRT division is shown in FIG. 2. In FIG. 2, a block diagram representation of divider 9 shown previously in FIG. 1 is shown to contain a partial remainder sum and carry register 25 coupled to receive an input dividend datavalue and coupled via a MUX select block 28 to carry-save-adder (CSA) 29. An input divisor datavalue is coupled directly to MUX 28. A carry-lookahead-adder (CLA) 26 transmits a predetermined number of bits of the input dividend signal to a divisor prediction programmed logic array (PLA) 20. PLA 20 provides a predicted divisor to MUX select block 28, wherein the predicted divisor is multiplied by an appropriate constant. In the radix 4 case of FIG. 2, the multiplier values may correspond to $-2, -1, 0, +1$, and $+2$. Redundant sum and carry vectors are routed from partial remainder register 25 via MUX 28 to CSA 29, wherein the divisor multiple is subtracted from the sum and carry components. Thereafter the results are shifted left within shift register 30 (i.e., multiplied) and then routed back to partial remainder register 25.

The accumulated quotient bits derived during each iteration of the SRT algorithm are held in quotient register 27, and then passed to a MUX 31 wherein the partial remainder is combined with the quotient, rounded, and then routed out as a final result. As can be seen in FIG. 2, in SRT division multiple bits of the dividend are examined and compared to the divisor, whereafter the divisor is subtracted from the dividend and the remainder examined until the remainder is smaller than the divisor. There is a trade-off between higher radix speed and circuit complexity. Thus, although larger number of bits may be accommodated by higher radix SRT division implementations, the implementation may produce a circuit complexity which is too expensive to fabricate or too large to be contained on a small silicon chip. SRT division will not be explained herein in detail, the reader instead being referred to any of several published books and articles describing SRT division, including, Fandrianto, *Algorithm for High-Speed Shared Radix 4 Division and Radix 4 Square Root* (IEEE Publ. No. CH2419-0/87/0000/0073, 1987).

As described above, radix n SRT division implementations have heretofore used a quotient prediction PLA in addition to a partial remainder register to produce appropriate signals for input to a multiplexor (MUX). The MUX then chooses the divisor times an appropriate divisor multiple depending on the returned value of the previous partial remainder from the previous divisor-dividend comparison. Significantly, it is seen that the MUX selection of divisor multiples follows the predicted divisor generated by the PLA. The divisor multiple is then routed to the partial remainder register and again to the next quotient prediction PLA in order to generate a new divisor estimate for the next iteration.

Although the aforesaid quotient prediction scheme works well for clock frequencies to approximately 25 megahertz (MHz), the design is inadequate for high frequency circuits approaching 80-100 MHz. For example, in a high frequency division application, the predicted next divisor may not be provided by the divisor prediction PLA 20, routed through the MUX divisor multiplier 28, and then passed through the CSA 29 in sufficient time to be latched into the partial remainder register 25 for the next iteration. In such a case, the late arriving divisor multiple will prevent the divisor prediction PLA 20 from correctly predicting the next divisor guess in the next clock cycle. Thus, delivery of the predicted divisor to the MUX divisor multiplier 28 and subsequently routing the divisor multiple to the partial remainder register 25 is a performance limiting speedpath, wherein divider circuit operation suffers or fails due to the non-timely arrival of the divisor multiple used in connection with the current partial remainder.

Moreover, in order to share the particular datapath with multiple mathematical functions, it may be desirable or necessary to preserve or generate quotient bits differently than predicted by the PLA for a particular mathematical function. In other words, a designer may want to "force" the selection of a particular divisor multiple for particular floating point division operations. For example, the quotient prediction PLA may indicate that quotient bits of "10" are required, when in fact the designer wishes the quotient bits to be "01". Forcing particular quotient bits could be implemented by providing appropriate gates prior to divisor multiplier MUX 28. However, the speedpath alluded to in connection with the prior art SRT divisor and root prediction PLA configuration would still exist, and would be worsened by requiring a MUX or other logic to deliver the predicted divisor and the current quotient to the divisor multiplier MUX, and then routing the divisor multiple to the partial remainder register in time to be used for the divisor selection in the next clock cycle.

Accordingly, and as will be described in more detail in the following detailed description, the present invention provides a logic arrangement that significantly reduces the speedpath associated with the quotient prediction and quotient multiplication logic in high frequency division circuits. Moreover, the quotient selection may be expeditiously forced or selected as required for the particular mathematical operation being executed on a shared datapath.

SUMMARY OF THE INVENTION

Apparatus and methods for improving the computing capacity of digital information processing systems in high speed higher radix SRT divider circuits is disclosed. In a processor having a central processing unit and a floating point unit including a divider, a quotient prediction programmed logic array PLA receives input signals from one or more multiplexors. One multiplexor (MUX) receives as an input an early, unlatched partial remainder from a carry-propagate-adder (CPA) which combines redundant sum and carry vectors into nonredundant form, the sum and carry vectors being derived from a 3:2 carry-save-adder (CSA) and latched in separate sum and carry latches. Input dividend and divisor data values are routed to the CSA through associated multiplexors including divisor multiplier logic. A second multiplexor gates constant values to be multiplied with the current partial remainder. The PLA also receives a 4-bit data segment of the divisor for the current division iteration. The PLA evaluates the most significant bits (MSBs) of the divisor together with the MSBs of the next (unlatched) partial remainder, and produces an output quotient estimate consisting of either 1, 2 or 0 (binary 01, 10 or 00). The quotient estimate is then transmitted to a pair of multiplexors leading to redundant positive and negative quotient registers. The quotient estimate in connection with a sign signal are used as control signals to a third MUX which gates the divisor multiples to be used in the next division iteration during the next clock cycle. Ordinary quotient prediction may be overridden, wherein the state machine sends an appropriate control signal one clock cycle early causing a divisor multiple of zero or ±1D (binary 00 or 1* divisor) to be steered into the CSA via the third MUX. A divisor multiple of zero can be used to cause a previously derived partial remainder value stored in the sum and carry latches to be recycled unchanged in the division datapath, thereby permitting multicomponent data values (i.e., quotient and remainder) to be sequentially routed out along a single output bus, or to force particular mathematical operations at chosen times. By placing the divisor multiple logic before the quotient prediction PLA, the speedpath of the SRT division implementation is substantially improved.

BRIEF DESCRIPTION OF THE DRAWINGS

The present invention will be understood more fully from the detailed description given below and from the accompanying drawings of the preferred embodiment of the invention in which.

DETAILED DESCRIPTION OF THE INVENTION

Apparatus and methods for improving the computing capacity of digital information processing systems in high speed higher radix SRT divider circuits are disclosed. In the following description, for purposes of explanation, specific numbers, times, signals etc., are set forth in order to provide a thorough understanding of the present invention. However, it will be apparent to one skilled in the art that the present invention may be practised without these specific details. In other instances, well known circuits and devices are shown in block diagram form in order not to obscure the present invention unnecessarily.

Figure 1:
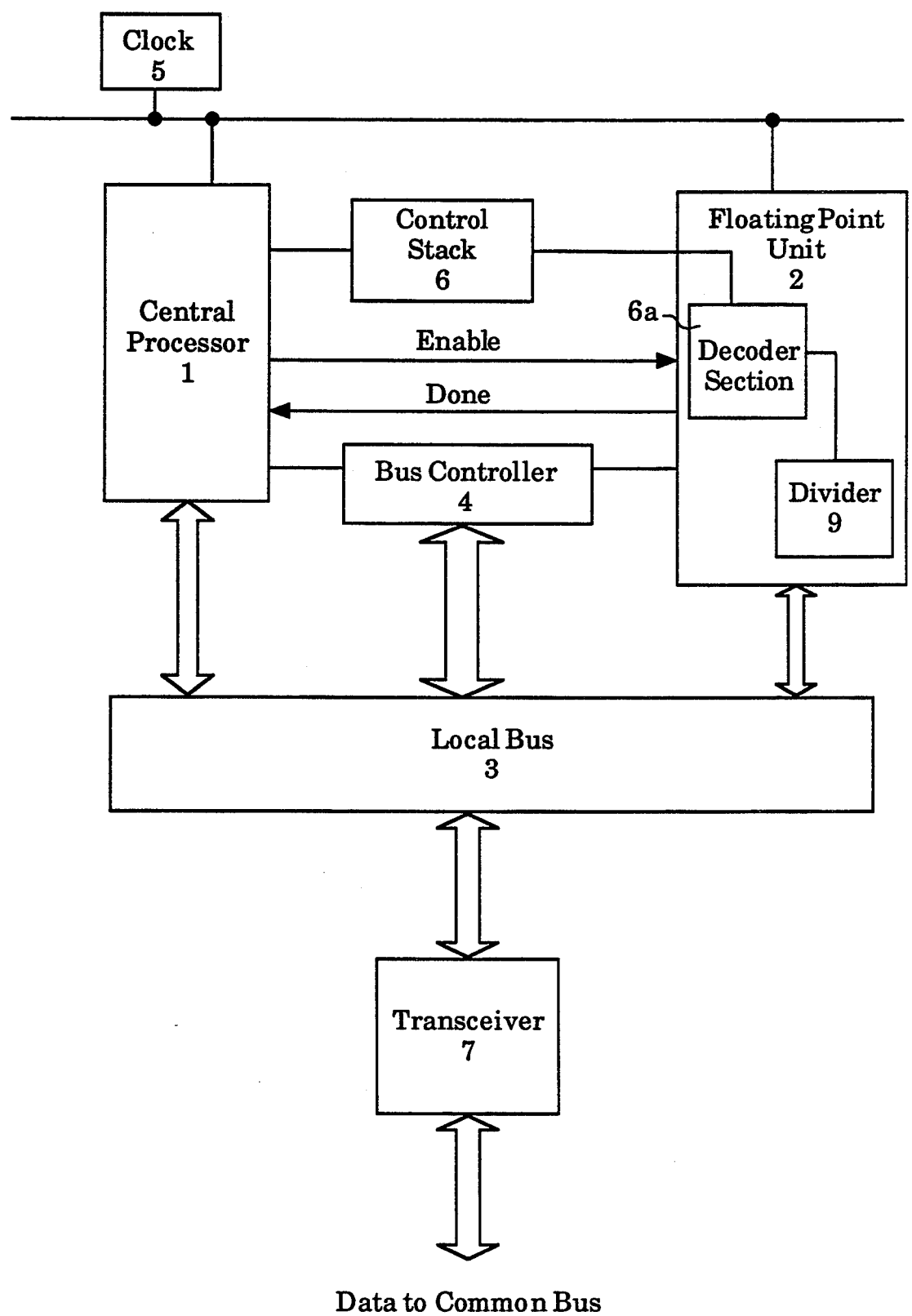
FIG. 1 is a block diagram of a prior art information processing system containing a special purpose floating point processor.
Figure 2:
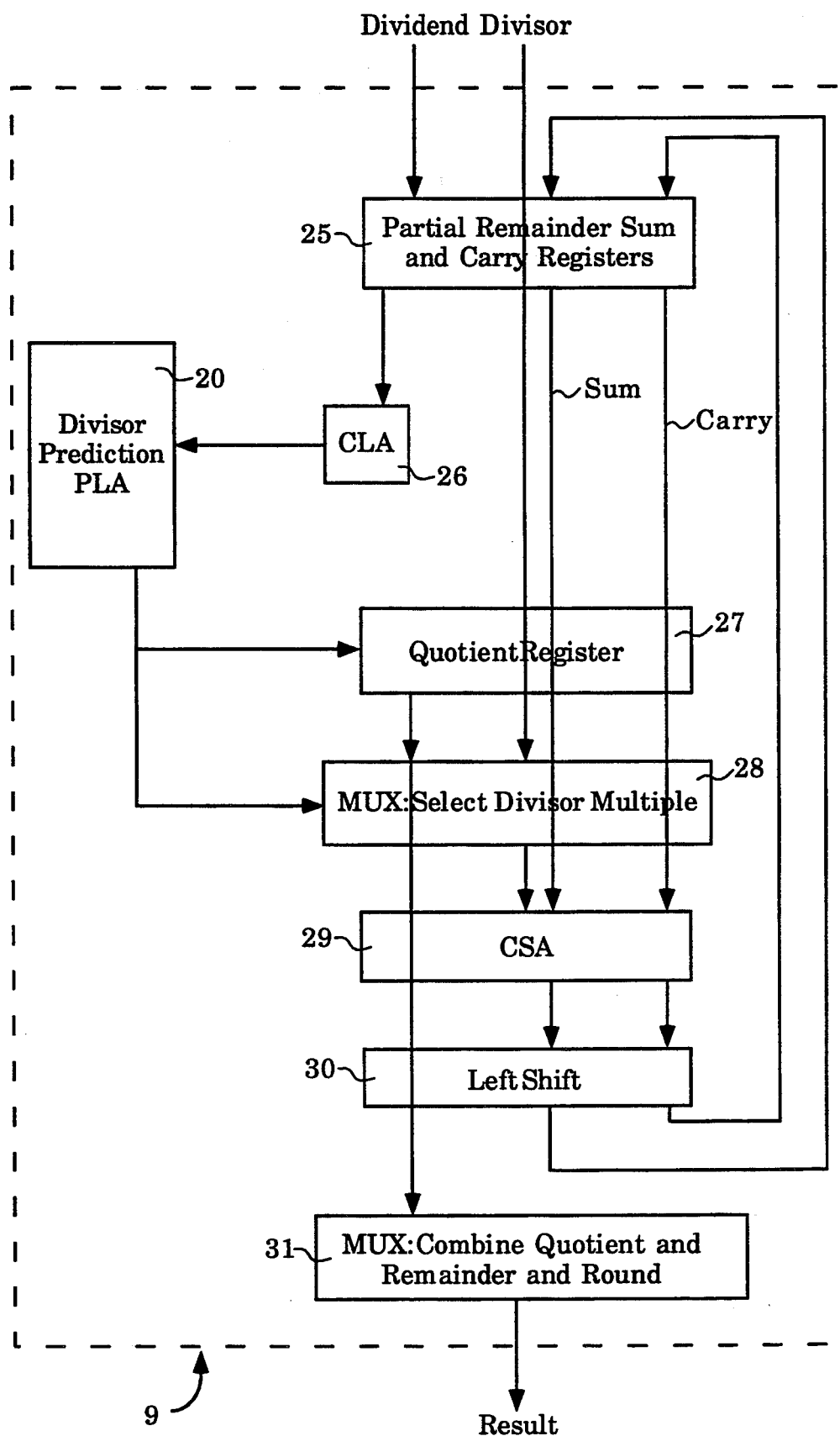
FIG. 2 is a block diagram illustration of a prior art implementation of higher radix (radix 4) SRT division.
Figure 3:
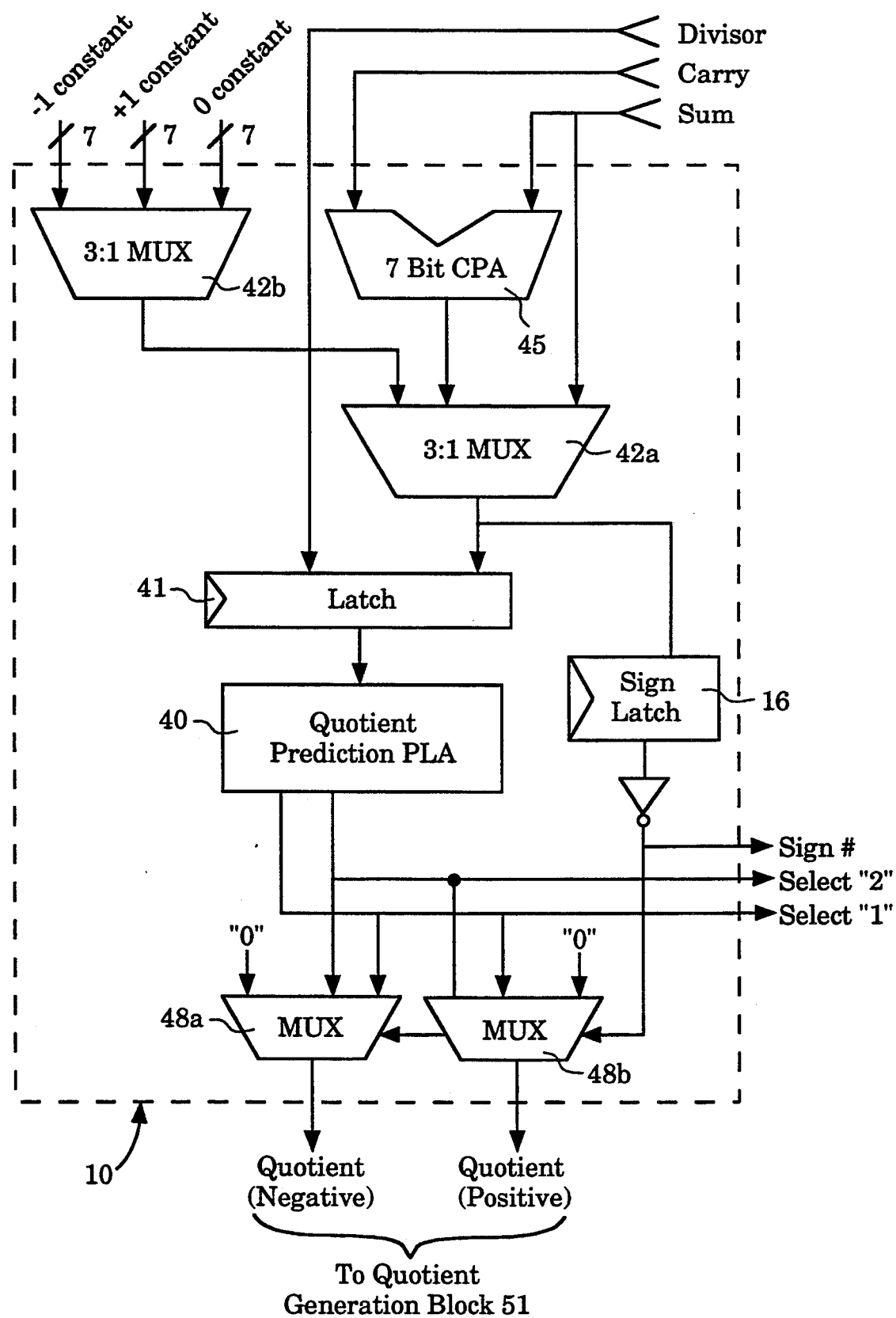
FIG. 3 is a block diagram illustration of the quotient prediction hardware for higher radix SRT division according to the present invention.

Reference is now made to FIG. 3, wherein a quotient prediction block 10 according to the present invention is shown. In FIG. 3, a quotient prediction programmed logic array (PLA) 40 is shown receiving input signals representing the current divisor, and the current partial remainder derived in an iterative SRT division scheme and routed from a division block (not shown) through a seven-bit carry-propagate-adder (CPA) 45. In particular, the partial remainder routed from the division hardware is brought in as a pair of sum and carry vectors in redundant carry-save notation. The redundant sum and carry vectors are subsequently combined in CPA 45 to form a single non-redundant data value representing the current partial remainder. The current partial remainder is then routed from CPA 45 to shift register 41 via a multiplexor (MUX) 42a. MUX 42a receives as further input, the selected output of a second MUX 42b whose inputs are constant data values representing +1, −1, and 0, which constant values will be used in a manner described below. It will be obvious to the skilled reader that the input sum and carry vectors could equally well be routed through other steering means, for example, a single MUX having five inputs, the two 3:1 MUXs being merely an attribute of the specific embodiment shown in FIG. 3.

PLA 40 examines the next most significant bits (MSB) of the divisor together with the next MSBs of the next not yet latched partial remainder as supplied by CPA 45 and gated through multiplexor 42a. Based on the particular bit values of the DIVISOR and of the non-redundant partial remainder, quotient prediction PLA 40 will provide a binary output which is either 01, 10, or 00. PLA 40 produces two outputs "SELECT 1" and "SELECT 2", representing binary 01, binary 10, and binary 00 respectively. SELECT 1 and SELECT 2 form inputs for subsequent steering MUXs 48a and 48b leading to the balance of a quotient generation block 51 as will be shown in more detail in connection with FIG. 4. As will also be shown in FIG. 4, SELECT 1 and SELECT 2 together with a separately routed SIGN signal taken from MUX 42a are further used to select the divisor multiple to be added or subtracted from previous partial remainders derived during the SRT division execution. In particular, the present invention provides divisor multiples of +2, +1, 0, −1, and −2.

Figure 4:
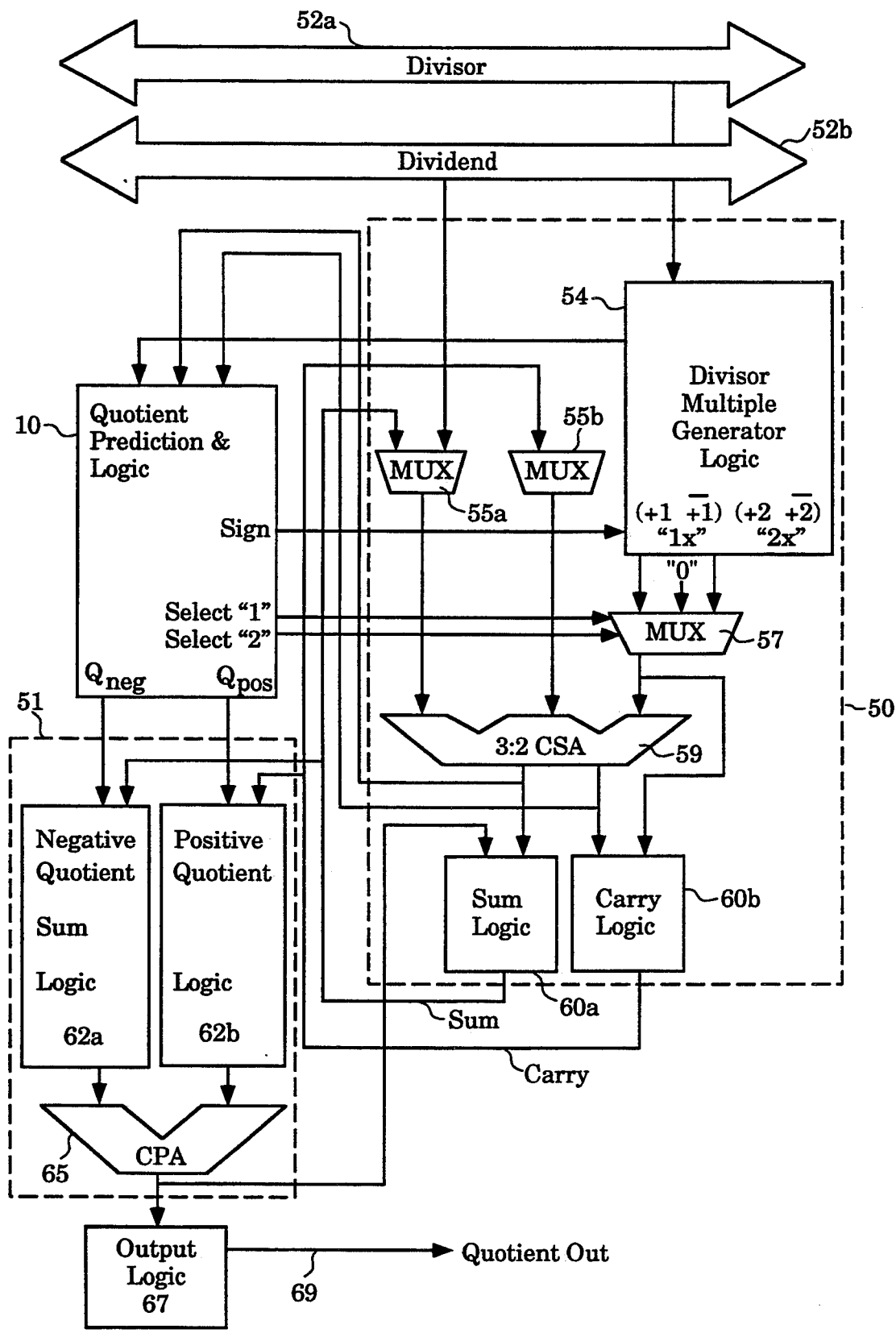
FIG. 4 is a block diagram illustration of the SRT division hardware including the quotient prediction hardware shown in FIG. 3.

Reference is now made to FIG. 4, wherein the component parts of the quotient and remainder generation hardware of the present invention are shown. In FIG. 4, quotient prediction block 10 of FIG. 3 is shown, together with the remainder generation block 50 and quotient generation block 51. The arrangement of blocks 10, 50, and 51 in the present invention show how the quotient multiplier logic has been separated from quotient prediction PLA 40. Accordingly, the combinational logic necessary to determined quotient multipliers in override conditions after the quotient bits have has been selected by the PLA 40 are avoided in the present invention. Blocks 50 and 51, shown in FIG. 4 are merely exemplary implementations of division hardware which may be used to realize the present invention. However, many other hardware implementations for division could be designed, and the present invention included in them. The reader should further note that quotient and remainder values are maintained in redundant notation throughout the entire embodiment of the present invention, except for the final output stage wherein the redundant quotient components are combined into a final non-redundant form and then routed to the output datapath.

Remainder generation block 50 is seen to include a divisor multiple generator logic block 54, which may consist of several MUXs, to gate a plurality of divisor multiples from an appropriately configured divisor datapath 52a to a divisor multiple gating MUX 57. As presently preferred, divisor multiple generator logic block 54 produces divisor multiples of +1* divisor and +2* divisor (2D). MUX 57 also receives an input a constant "0" value. MUX 57 is also seen to receive the two control signals SELECT 1 and SELECT 2 from the quotient prediction block 10. Similarly, dividend input logic formed of MUXs 55a and 55b, steer the dividend from an appropriately configured dividend datapath 52b to a 3:2 carry-save-adder (CSA) 59. If necessary, the divisor and dividend values may be routed through MUX logic to accommodate occasions when the operands must be reversed.

The SELECT 1 and SELECT 2 signals are used to control the output of 3:1 MUX 57, the output of MUX 57 being "1D", "2D", "0D", −1D, or −2D. Note: block 54 generates −1x−2x divisor if sign is asserted.

The output of MUX 57 is then passed to one input of 3:2 CSA 59, the CSA 59 receiving the redundant representations of the partial remainder, namely sum and carry vectors, for the remaining two inputs from MUX 55a and MUX 55b, respectively. Importantly, the sum and carry vectors represent the current partial remainder, and are used in the current, not previous clock cycle. The two outputs of CSA 59 representing the partial remainder after subtraction of the divisor multiple from the partial remainder, are then separately latched in sum and carry logic blocks 60a and 60b, respectively. Further, the latched sum and carry vectors are routed to quotient prediction block 10 (including PLA 40) in order to determine the next two quotient bits during the next clock.

Representations of the resultant quotient are made available as redundant negative quotient and positive quotient outputs from quotient prediction block 10. Both redundant forms are then steered through separate negative quotient and positive quotient logic blocks 62a and 62 b, respectively, whereafter the redundant quotient forms are combined in carry-propagate-adder (CPA) 65. Finally, the non-redundant combined quotient is steered onto an output datapath 69 via output logic block 67. In the present embodiment, the negative and positive quotient logic blocks 62a and 62b, as well as output datapath 69 are shared datapaths, passing non-redundant representations of both the quotient and remainder, depending on the clock cycle and control signals supplied by the state machine.

During operation of the division hardware, it is occasionally necessary to override the ordinary quotient prediction operation of the PLA 40. That is, for various reasons, it is desirable to suppress the prediction of quotient bits by PLA 40, and instead substitute a predetermined quotient bit or sequence of bits. For example, one such instance arises when separate or multicomponent data values are manipulated and/or routed along shared datapaths. In particular, in the preferred embodiment of the present invention the single output datapath 69 is used to deliver many different data values, including the quotient and associated remainder determined during various floating point division operations. As shown in FIG. 4, the quotient generation block 51 datapath delivers the output remainder and quotient sequentially in consecutive clock cycles. Because the division datapath, consisting of quotient and remainder generation blocks 51 and 50, operates on the associated data values every clock cycle, it is accordingly necessary to maintain the resultant remainder in its current value while the quotient is routed to shared output datapath 69. In other words, the remainder is recirculated in the remainder generation block 50 to avoid altering the accumulated quotient while the quotient is routed to the output datapath. In order to recirculate the remainder unchanged while the quotient is delivered to output datapath 69, the quotient prediction of the present invention is suppressed to prevent further iterative alteration of the remainder.

Overriding of quotient prediction by PLA 40 is implemented in the present invention by delivering a divisor multiplier of zero in the clock cycle the quotient is routed to the output datapath. The divisor multiple is then added to the previous partial remainder, that is, the previous partial remainder has added to it zero times the current partial remainder. However, zero times the current partial remainder is zero, the resulting sum being the previous partial remainder plus zero, or just the previous partial remainder which is stored in redundant form in appropriate latches in the remainder generation block 50. It should be noted that the partial remainder can be circulated within the present invention's preferred embodiment every clock cycle so long as the divisor multiple is selected or forced to be zero. Accordingly, the present invention avoids the need for a large and complex piece of combinational logic to override the normal bit selection by PLA 40, which would deliver a pair of quotient bits in accordance with the input signals an associated propagation delay of several nanoseconds, thereby improving the speedpath of the present invention.

When overriding ordinary quotient prediction in PLA 40, the state machine (not shown) will send an appropriate control signal one clock "early" to suppress the ordinary quotient selection. In the present case, "early" signifies that the clock signal is transmitted before the current data value is latched, prior to manipulation within the remainder generation block 50. It should be further noted that the sum and carry vectors are routed to the CPA 45 (FIG. 3) and subsequently to input multiplexors 42a and 42 b (FIG. 3) before the sum and vectors are latched, to enhance the speed of the present invention.

With reference to both FIGS. 3 and 4, operation of the quotient prediction override mechanism of the present invention will be now described. During ordinary quotient operations, quotient prediction PLA 40 examines an appropriate number of next most significant bits (MSBs) of the current divisor in combination with an appropriate number of next MSBs of the "next" partial remainder. It should be remembered that "next" is the present value of the partial remainder before it is latched. Redundant sum and carry vectors from the next partial remainder are routed to CPA 45, wherein they are combined into a single non-redundant representation of the next partial remainders. CPA 45 then transmits the combined nonredundant representation of the next partial remainder via multiplexor 42a, to quotient prediction PLA 40 (See FIG. 3) according to a properly timed first control signal, and internally latched. Constant remainder values of $+1$, 0, and $-1$ are similarly gated through multiplexor 42a according to a second control signal. At the same time, the next most significant bits of the current divisor are passed to quotient prediction PLA 40 and latched. A SIGN signal representing the sign of the partial remainder is separately routed to a SIGN latch 16, and is routed through PLA 40 as well. Ordinarily, quotient prediction PLA 40 examines all bits comprising the current divisor and partial remainder, and determines therefrom what will be the next two quotient bits, either 01, 10, or 00 (binary). The binary output is then distributed as control signals SELECT 1 and SELECT 2 as shown in FIG. 3. The quotient will then be updated according to the selected bits "guessed", and the partial remainder determined therefrom.

In cases where the quotient is fully determined, the quotient will be routed out onto the output datapath 69 as the final result. However, as shown in FIG. 4, there is only one access to output datapath 69 in the preferred embodiment, namely through quotient generation logic block 51. The quotient and its associated remainder must therefore be routed out to the databus separately in time, during separate clock cycles. In particular, the partial remainder is delivered to the output datapath first, followed by the quotient. Where the remainder is routed to the output datapath prior to delivery of the quotient value, the remainder must be kept constant during the time the quotient value is being delivered to the output datapath 69 via quotient generation logic block 51.

Because the datapath of the remainder block 50 is being prepared to perform another division iteration, while the quotient is steered to the output datapath 69, it is necessary to prevent quotient prediction according to the normal operation of quotient prediction PLA 10. In other words, it is necessary to "override" or "overrule" the ordinary quotient prediction function of PLA 40 by forcing a condition such that the current partial remainder is not altered during the time the quotient is routed out onto the output datapath 69. In the preferred embodiment, the override function is implemented by the MUX 57, to steer a constant 0 value to CSA 59, which is subsequently latched into and combined in 3:2 CSA 59, as shown in FIG. 4. The override signal (i.e., "0") is sent by the state machine at such time that the output result including quotient and remainder is to be routed to the output datapath 69. In addition, there may be other times when the state machine overrides ordinary quotient prediction by PLA 40 and drives a '0' through MUX 57, thereby causing the remainder block 50 to recirculate the partial remainder during that clock cycle. In other words, the current partial remainder is multiplied by the divisor multiple of '0' causing the current partial remainder to add itself to '0', thereby recirculating the same result within the division datapath. This permits a multicomponent datavalue to be routed out on to a single shared output datapath unchanged in the clock cycle that it is ready.

It should be noted that the quotient prediction overrule by the state machine accordingly complicates programming of the state machine to accomplish the foregoing. However, it significantly improves the speedpath of the remainder (i.e., division) and quotient blocks 50 and 51, and thus yields a net performance increase, permitting the present invention to be incorporated into computer and microprocessor arrangements operating at clock speeds of 50 to 80 MHz, or more.

The foregoing has described a hardware implementation for quotient prediction overrule in high speed higher radix SRT division computation circuits. It is contemplated that changes and modifications may be made by one of ordinary skill in the art, to the device components and arrangements of elements of the present invention without departing from the spirit and scope of the invention.

I claim:

1. A quotient prediction circuit in a floating point divider, comprising:

partial quotient generation circuit for generating a first partial quotient for a first iteration of a series of iterations of a division algorithm performed in said floating point divider, said partial quotient generation circuit generating said first partial quotient by examining a first partial remainder of said first iteration and a divisor; and override circuit for forcing a second partial quotient for an another iteration of said division algorithm equal to a predetermined value independent of a second partial remainder of said another iteration and said divisor.

2. The quotient prediction circuit of claim 1 wherein said partial quotient generation circuit examines said divisor and a most significant portion of said first partial remainder to generate said first partial quotient.

3. The quotient prediction circuit of claim 1 wherein said override circuit comprises a multiplexer receiving an override value and said second partial remainder as inputs during said second iteration, said multiplexer coupling said override value to said partial quotient generation circuit, said override value causing said partial quotient generation circuit to generate said predetermined value as said second partial quotient.

4. The quotient prediction circuit of claim 3 wherein said partial quotient generation circuit comprises a programmable logic array (PLA) coupled to receive said override value and said first partial remainder, said PLA mapping said first partial remainder and said divisor to said first partial quotient, and said override value to said predetermined value.

5. The quotient prediction circuit of claim 4 wherein said division algorithm is an SRT algorithm.

6. The quotient prediction circuit of claim 1 wherein said predetermined value is in a range of minus two to plus two.

7. A floating point divide circuit for performing a division operation according to an algorithm having a series of iterations, comprising:
divisor multiple generator coupled to receive a partial quotient over a quotient datapath during each of said series of iteration, said divisor multiple generator generating a product of said partial quotient and a divisor during each of said series of iterations;
subtraction circuit coupled to receive said product over a divisor multiple datapath, and a partial remainder for each of said series of iterations over a subtraction datapath, said subtraction circuit generating said partial remainder for each of said series of iterations by subtracting said product from said partial remainder for each of said series of iterations, said subtraction circuit coupled to transfer said partial remainder generated over said subtraction datapath; and
quotient prediction circuit coupled to receive said partial remainder during each of said series of iterations, said quotient prediction circuit generating said partial quotient by examining said partial remainder and said divisor during a first set of iterations in said series of iterations, said quotient prediction circuit further generating said partial quotient equal to a predetermined value independent of said divisor and said partial remainder under control of an override signal during a second set of iterations in said series of iterations, said quotient prediction circuit coupled to transfer said partial quotient over said quotient datapath during each of said series of iterations.

8. The floating point divide circuit of claim 7 further comprising a quotient generation circuit for generating a quotient for said division operation by adding said partial quotient of each of said series of iterations according to said algorithm.

9. The floating point divide of claim 8 wherein said partial remainder is a remainder of said division operation after completion of said algorithm.

10. The floating point circuit of claim 9 wherein said quotient prediction circuit sends said quotient during a first iteration in said second set of iterations and said remainder during a subsequent iteration over a bus.

11. The floating point divide circuit of claim 10 wherein said override signal forces said partial quotient to zero during said first iteration such that said partial remainder is available as said remainder during said subsequent iteration.

12. The floating point divide circuit of claim 7 wherein said quotient prediction circuit comprises:
multiplexer accepting an override value and said partial remainder of each of said series of iteration as inputs, said multiplexer generating an output by selecting said override value during said second set of iterations, and said partial remainder during said first set of iterations; and
partial quotient generation circuit for generating said partial quotient during each of said series of iterations, said partial quotient generation circuit generating said said partial quotient by examining said output and said divisor.

13. The floating point divide circuit of claim 12 wherein said partial quotient generation circuit comprises a programmable logic array (PLA) that maps said partial remainder and said divisor to said partial quotient, and said override value to said predetermined value.

14. The floating point divide circuit of claim 13 wherein said algorithm is an SRT division algorithm.

15. A computer system comprising:
processor coupled to transfer a floating-point instruction comprising a divisor and a dividend; and
floating point divide circuit coupled to receive said divisor and said dividend, said floating point divide circuit performing a division operation according to an algorithm having a series of iterations, said floating point divide circuit comprising:
divisor multiple generator coupled to receive a partial quotient over a quotient datapath, said divisor multiple generator generating a product of said partial quotient and said divisor during said series of iterations;
first multiplexer coupled to receive said dividend over a dividend input, and a subtraction output over a subtraction output datapath, said first multiplexer generating a partial remainder by selecting said dividend during a first iteration and said subtraction output during each subsequent iteration in said series of iterations, said first multiplexer coupled to transfer said partial remainder over a partial remainder datapath;
subtraction circuit coupled to receive said product over a divisor multiple datapath, and said partial remainder for each of said series of iterations over said partial remainder datapath, said subtraction circuit generating said subtraction output by subtracting said product from said partial remainder during each of said series of iterations, said subtraction circuit coupled to transfer said subtraction output over said subtraction output datapath; and
quotient prediction circuit coupled to receive said partial remainder during each of said series of iterations, said quotient prediction circuit generating said partial quotient by examining said partial remainder and said divisor during a first set of iterations in said series of iterations, said quotient prediction circuit further generating said partial quotient equal to a predetermined value independent of said divisor and said partial remainder under control of an override signal during a first set of iterations in said series of iterations, said quotient prediction circuit coupled to transfer said partial quotient over said quotient datapath.

16. The computer system of claim 15 wherein said floating point divide circuit further comprises a quotient generation circuit for generating a quotient for said division operation by adding said partial quotient of each of said series of iterations according to said algorithm.

17. The computer system of claim 16 wherein said partial remainder is a remainder of said division operation after completion of said algorithm.

18. The computer system of claim 17 wherein said floating point divide circuit transfers said quotient during a second iteration in said second set of iterations and said remainder during a subsequent iteration over a bus.

19. The computer system of claim 18 wherein said partial quotient during said second iteration is zero such that said partial remainder is available as said remainder during said subsequent iteration.

20. The computer system of claim 15 wherein said quotient prediction circuit comprises:
second multiplexer accepting an override value and said partial remainder as inputs during each of said series of iterations, said second multiplexer generating an output by selecting said override value during said second set of iterations, and said partial remainder during said first set of iterations; and
partial quotient generation circuit for generating said partial quotient during each of said series of iterations, said partial quotient generation circuit generating said partial quotient by examining said output and said divisor.

21. The computer system of claim 20 wherein said partial quotient generation circuit comprises a programmable logic array (PLA) that maps said partial remainder and said divisor to said partial quotient, and said override value to said predetermined value.

22. The computer system of claim 21 wherein said algorithm is an SRT division algorithm.

23. A floating point divide circuit for performing a division operation according to an algorithm having a series of iterations, comprising:
divisor multiple generator coupled to receive a partial quotient over a quotient datapath during each of said series of iterations, said divisor multiple generator generating a product of said partial quotient and a divisor during each of said series of iterations;
subtraction circuit coupled to receive said product over a divisor multiple datapath, and a partial remainder for each of said series of iterations over a subtraction datapath, said subtraction circuit generating said partial remainder for a next iteration by subtracting said product from said partial remainder, said subtraction circuit coupled to transfer said partial remainder for said next iteration over said subtraction datapath, wherein said partial remainder of a last iteration of said series of iterations is a remainder of said division operation;
quotient generation circuit receiving a partial remainder, said quotient generation circuit generating a quotient for said division operation by adding said partial quotient of each of said series of iterations according to said algorithm, said quotient generation circuit transferring said quotient during said last iteration and said remainder during a subsequent iteration over a bus;
quotient prediction circuit coupled to receive said partial remainder during each of said series of iterations, said quotient prediction circuit generating said partial quotient for each of said series of iterations by examining said partial remainder and said divisor, said quotient prediction circuit further generating said partial quotient equal to zero during said subsequent iteration such that said remainder generated in said last iteration is available during said subsequent iteration for transfer over said bus.

24. The floating point divide circuit of claim 23 wherein said quotient prediction circuit comprises:
multiplexer accepting an override value and said partial remainder of each of said series of iteration as inputs, said multiplexer generating an output by selecting said override value during said subsequent iteration, and said partial remainder during said series of iterations; and
partial quotient generation circuit for generating said partial quotient during each of said series of iterations, said partial quotient generation circuit generating said partial quotient by examining said output and said divisor, said partial quotient generation circuit generating said partial quotient equal to zero if said multiplexer selects said override value as said output.

* * * * *